United States Patent [19]

Elsbett et al.

[11] Patent Number: 4,858,579
[45] Date of Patent: Aug. 22, 1989

[54] FUEL-INJECTION FOR DIRECT-INJECTION DIESEL ENGINE

[76] Inventors: Ludwig Elsbett; Günter Elsbett; Klaus Elsbett, all of Industriestrasse 14, D-8543 Hilpoltstein, Fed. Rep. of Germany

[21] Appl. No.: 214,728
[22] PCT Filed: Aug. 31, 1987
[86] PCT No.: PCT/DE87/00390
   § 371 Date: Apr. 28, 1988
   § 102(e) Date: Apr. 28, 1988
[87] PCT Pub. No.: WO88/01683
   PCT Pub. Date: Mar. 10, 1988

[30] Foreign Application Priority Data

Aug. 29, 1986 [DE] Fed. Rep. of Germany ....... 3629437

[51] Int. Cl.$^4$ .................. F02B 3/12; F02M 61/14; F02M 63/02
[52] U.S. Cl. ................... 123/299; 123/301; 123/305
[58] Field of Search ............. 123/276, 299, 300, 301, 123/305

[56]       References Cited
       U.S. PATENT DOCUMENTS 2,692,587 10/1954 Barber ................. 123/299 X
2,741,230  4/1956 Reynolds .............. 123/301 X
2,977,942  4/1961 Reynolds .............. 123/301
4,015,577  4/1977 Elsbett et al. ......... 123/276 X
4,543,930 10/1985 Baker ................. 123/300 X
4,733,641  3/1988 Ishida ................ 123/299 X

FOREIGN PATENT DOCUMENTS 0028287  5/1981 European Pat. Off. .
 854862 11/1952 Fed. Rep. of Germany .
2841972  4/1980 Fed. Rep. of Germany .
3214096 11/1982 Fed. Rep. of Germany .
3343677  6/1985 Fed. Rep. of Germany .
1414354  9/1965 France .
  96739 11/1922 Switzerland .
 609115  9/1948 United Kingdom .
2000222  1/1979 United Kingdom .
2051236  1/1981 United Kingdom .

OTHER PUBLICATIONS

Broeze, J. J., Combustion in Piston Engines, Publisher: De Technische Uitgeverij H. Stam N.V. (Haarlem-Antwerpen-Keulen), pp. 112-115, no date.
"New Combustion System Reduces Diesel-Engine Noise and Gaseous Emissions", Engineers Digest, vol. 35, No. 8 (Aug. 1974), p. 768.

Primary Examiner—Tony M. Argenbright
Attorney, Agent, or Firm—Peter K. Kontler

[57]              ABSTRACT

In order to reduce soot emissions from diesel engines, the necessary mixing of air and gasified fuel must be completed prior to the main combustion. On the other hand, noise is reduced to a minimum by providing that the pressure increase per degree of crankshaft rotation during combustion is no greater than the maximum pressure increase during the compression stroke.

16 Claims, 3 Drawing Sheets

FUEL-INJECTION FOR DIRECT-INJECTION DIESEL ENGINE

Fuel injection in piston combustion machines using a plurality of injection nozzles is generally employed for the introduction of different fuels, for varying the injection quantity by opening and closing the different nozzles and for uniformly distributing the fuel in the combustion chamber.

The present application is concerned with the pressure/temperature characteristics and the injection conditions which are to be achieved for a direct-injection diesel engine in order to reduce important emissions. A method of operating a diesel engine is proposed and is based on the duothermal process since it is on the basis of this process that reductions in emissions are measured in actual experiments. It should be possible to carry over the knowledge and teachings which are obtained to other applications and procedures.

The increasingly restrictive regulatory emission standards for combustion machines affect diesel engine operation, especially as regards noise and soot particles. The relationship between these two types of emissions will be explained below. With respect to soot particle emissions, problems arise particularly for fuels which are difficult to vaporize. Accordingly, the method steps to be outlined were conceived and performed experimentally for fuels, including vegetable fats, which are difficult to vaporize. For vegetable fats, specifically, it has been found that a series of advantages are obtained once the problem of fuel vaporization is overcome since these developing fuels have a neutral $CO_2$ balance and do not produce $SO_2$ or benzol (derivative) emissions.

For diesel engine operation, the object is thus to find a solution which achieves a reduction in soot particle emissions and also limits noise.

In the combustion method which is now provided as a solution, the number of injection nozzles with throttling pins is multiplied so that two or more such nozzles are used with the aim of shortening the mixing process, and hence the injection time. The need for accelerating the mixing process is due to the following: Soot particles are formed because liquid fuel continues to be brought into the combustion chamber even when the combustion procedure is terminating, that is, the conventional injection and mixing times cause liquid, gaseous and burning fuel components to exist concurrently over an extended period. This brings the danger that, to the extent the liquid fuel brought into the ongoing combustion process consists of hydrocarbons, only hydrogen can still be split off in the delayed gas phase while the carbon becomes visible as uncombusted soot.

As a first method step, then, an increase in the mixing speed and a reduction in the injection time are required so that, during injection, the last quantity of liquid fuel brought in vaporizes before the fuel admitted previously has generated such a high combustion temperature that the danger of soot formation exists for the last quantity of fuel. If all of the fuel is in the gas phase before the combustion temperatures become too high, the problem of soot formation is eliminated. When the mixing speed of air and fuel is increased while, on the other hand, the injection time is reduced, a substantial temperature increase of the working air during the injection period is avoided.

If, in addition, as the next important method condition, the combustion zone is concentrated at the center of the existing combustion chamber, the use of a plurality of injection nozzles enables the thus-accelerated mixing procedure to be fully utilized and a very rapid vaporization of the fuel to be achieved In order to prevent the liquid fuel from coming into contact with the combustion zone, it has already been proposed to carry out fuel vaporization at the wall of the combustion chamber, that is, for the fuel to be deposited on the wall of the combustion chamber as a film and to be transferred from there to the combustion chamber air and the combustion zone in vapor form. Although the liquid fuel here does not come into contact with the burning gases, increased CH emissions in the form of aldehydes, etc., instead of soot formation, occur in this process.

The two steps of increasing the mixing speed of air and fuel and of developing a central combustion zone surrounded by air are thus method conditions. Particular emphasis must be placed on achieving the smallest possible proportion of air since a stoichiometric mixture of air and fuel does not leave any excess oxygen for undesired $NO_x$ formation. The optimal concentration corresponding to the smallest possible proportion of air is obtained by separating combustion air and excess air. In the resulting duothermal process, the excess air and combustion air are subjected to intense rotation (see West German Patent No. 22 41 355, British Patent Specification No. 2 000 222 and West German Offenlegungsschrift No. 33 43 677 for this process).

The rotation of the combustion chamber air is so intense that the quantities of fuel injected inwards from the combustion chamber wall towards the combustion zone are deflected before they reach the opposite side of the combustion chamber. The fuel is thus maintained in suspension in the hottest portion of the combustion chamber air until it has vaporized. The accuracy of this procedure must be increased as the difficulty of vaporizing the fuel increases. This is the case with vegetable fats. However, if vegetable fat is totally vaporized prior to the main combustion, the advantages of the vegetable fat as regards the molecular structure of the hydrocarbons during the subsequent combustion process can be fully realized. The chain-like arrangement of the hydrocarbons is exceedingly suitable for smokeless combustion.

The pressure increase during the combustion process is the third method condition to be taken into account. With the rapid mixing which is achieved using a plurality of throttling pin nozzles and the rapid vaporization which occurs in the isolated duothermal combustion zone, the pressure increase in a cylinder during combustion should not generate undue noise. The pressure increase per degree of crankshaft rotation ($\Delta p/\Delta \alpha$) should not exceed a predetermined value. Low noise level and freedom from soot are currently equally fundamental and important for the utility of the diesel engine Accordingly, when viewing the two problems together, it is necessary to define a goal, other than the goals of accelerated injection and accelerated mixing of air and fuel, which causes the method not only to be effective but also to generate little noise.

Unacceptable noise generation can be avoided by late injection which allows the rate of pressure increase during combustion to be held to the maximum value of the compression phase. The conventional formula for diesel engine combustion by which pressure remains unchanged during combustion thus changes to the extent that the rate of pressure increase during firing of the cylinder, and not the pressure in the cylinder, remains constant. The constant rate of pressure increase during firing of the cylinder, which corresponds to the maximum pressure increase of the compression stroke, is maintained for the duration of the combustion process by virtue of the fact that the large quantities of fuel admitted by the plurality of nozzles burn increasingly rapidly thereby compensating for the reduction in pressure increase during the expansion stroke of the piston. Mixing must be accelerated by means of an appropriate number of nozzles as retardation of injection increases.

The constant pressure increase, that is, the regulation of injection time and injection quantity, is controlled via the characteristics of the throttling pin nozzles using pre-injection, if necessary, as is known in the art.

Intensive cooling of the air charge enhances this method since it is good to develop a large temperature differential between the combustion zone air and the excess air. This also helps to suppress $NO_x$ formation. The delayed start of injection in the method further helps to reduce $NO_x$.

In order to increase the number of possible combinations of injection pressure and injection time, a transverse bore is, for the first time, formed in the cylinder head. This bore is so large that an injection line for a second injection nozzle which is offset by 180° can extend through the same. Such measure is made possible by using a cylinder head for the present method which is cooled via a few bores by the engine oil only. By eliminating the cooling chambers which are normally provided for water cooling, it becomes possible to implement the above proposal involving the bore for the injection line.

Figure 1:
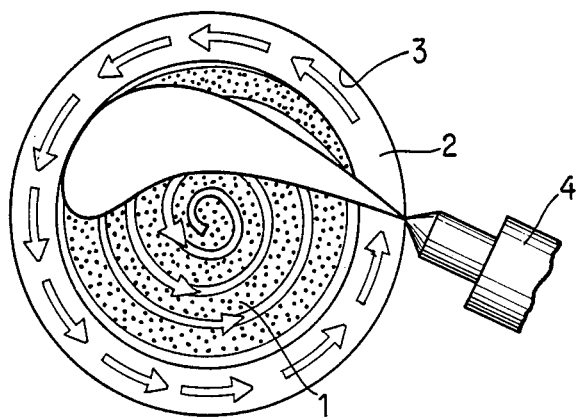
FIGS. 1 and 2 illustrate embodiments with one and two nozzles. Each is a plan view of the combustion chamber of a direct injector.

FIG. 1 represents the prior art as regards the duothermal combustion process. The air in the combustion chamber 1 and 2, which air is in the form of a vortex, is bounded by the combustion chamber wall 3. After injection by means of an injection pin nozzle 4, the spray from which does not reach the opposite side because of the intense vortex, two zones 1 and 2 are formed. Zone 1 constitutes the combustion zone with a stoichiometric air/fuel mixture. Zone 2 contains excess air which does not take part in the combustion and functions as an insulating jacket between the hot combustion zone and the cool combustion chamber wall 3.

Figure 2:
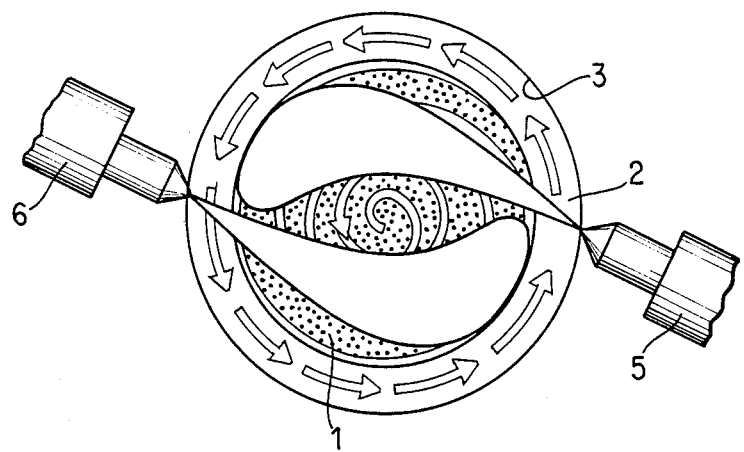

As an example of the use of a plurality of injection pin nozzles, FIG. 2 illustrates the case for two such nozzles 5 and 6. The flow situation is maintained; the duothermal arrangement of the combustion zone 1 and the excess air 2 is formed as in FIG. 1 since the fuel injected by the two nozzles does not reach the combustion chamber wall 3. FIG. 2 also shows that the entire combustion zone has been supplied with fuel while, in FIG. 1, only half of the mixing procedure is complete within the same time span and for the same rotational speed of the air vortex. Expressed differently, the mixing time is halved when the number of nozzles is doubled, is reduced to one-third for three nozzles, etc.

Figure 3:
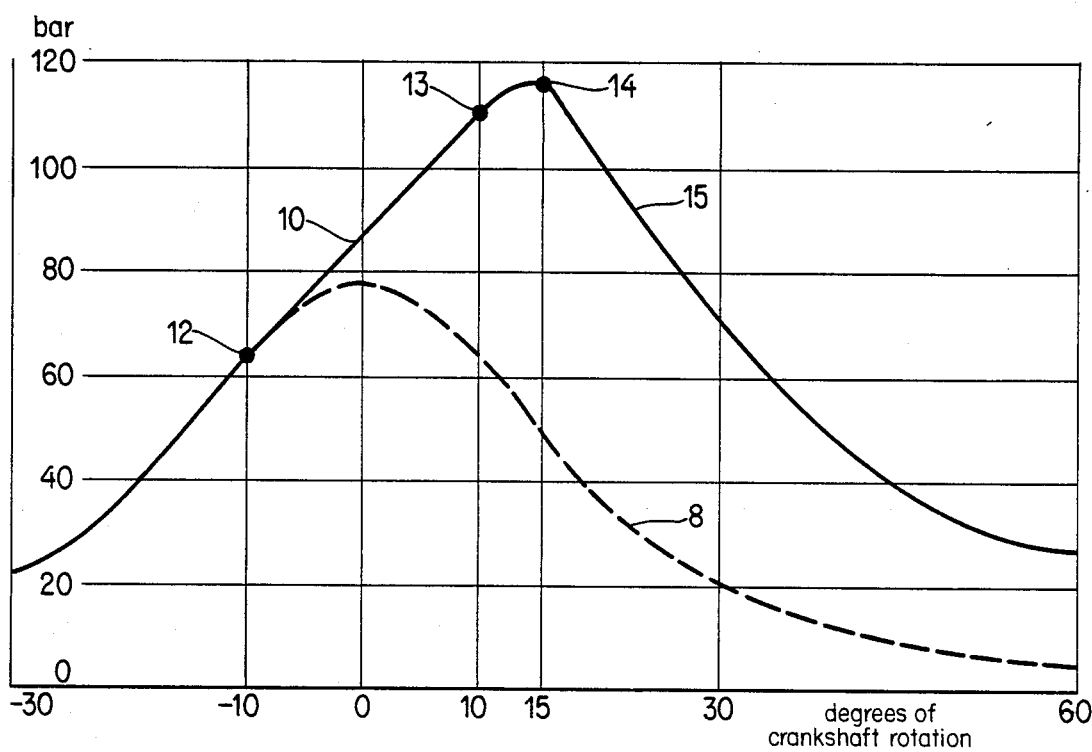
FIG. 3 is a plot of cylinder pressure versus crankshaft rotational angle.
Figure 4:
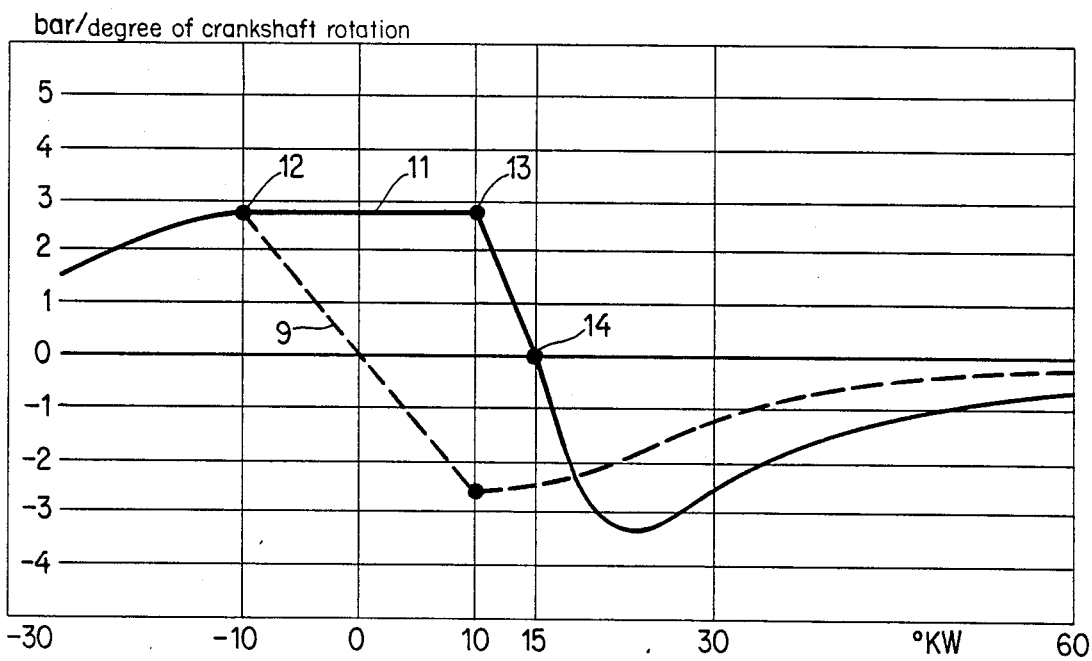
FIG. 4 is a plot of cylinder pressure per degree of rotation versus crankshaft rotation angle.

In the diagram of FIG. 3, the ordinate represents the pressure in the cylinder and the abscissa the angle of crankshaft rotation. The ordinate in FIG. 4 represents the pressure in the cylinder per degree of crankshaft rotation while the abscissa represents the angle of crankshaft rotation. The pressure variation which can be obtained in the cylinder with a plurality of injection nozzles and is desirable from the viewpoint of noise is illustrated in FIG. 3 and, between point 12 and point 13, corresponds to a line shown in FIG. 4 and representing a constant pressure increase, $\Delta p/\Delta \alpha$, of 2.8 bars per degree of crankshaft rotation. The curve 8 in FIG. 3 shows the pressure variation when the engine is not firing while the curve 9 in FIG. 4 illustrates the pressure increase when the engine is not firing.

The substance of the pressure variation according to the invention is represented by the line 10 in FIG. 3 and the line 11 in FIG. 4 extending between the points 12 and 13. The pressure increase from point 12 to point 13 is approximately constant. The line from point 13 to point 14 corresponds to the dying out of combustion and is followed by the theoretical expansion line 15.

Figure 5:
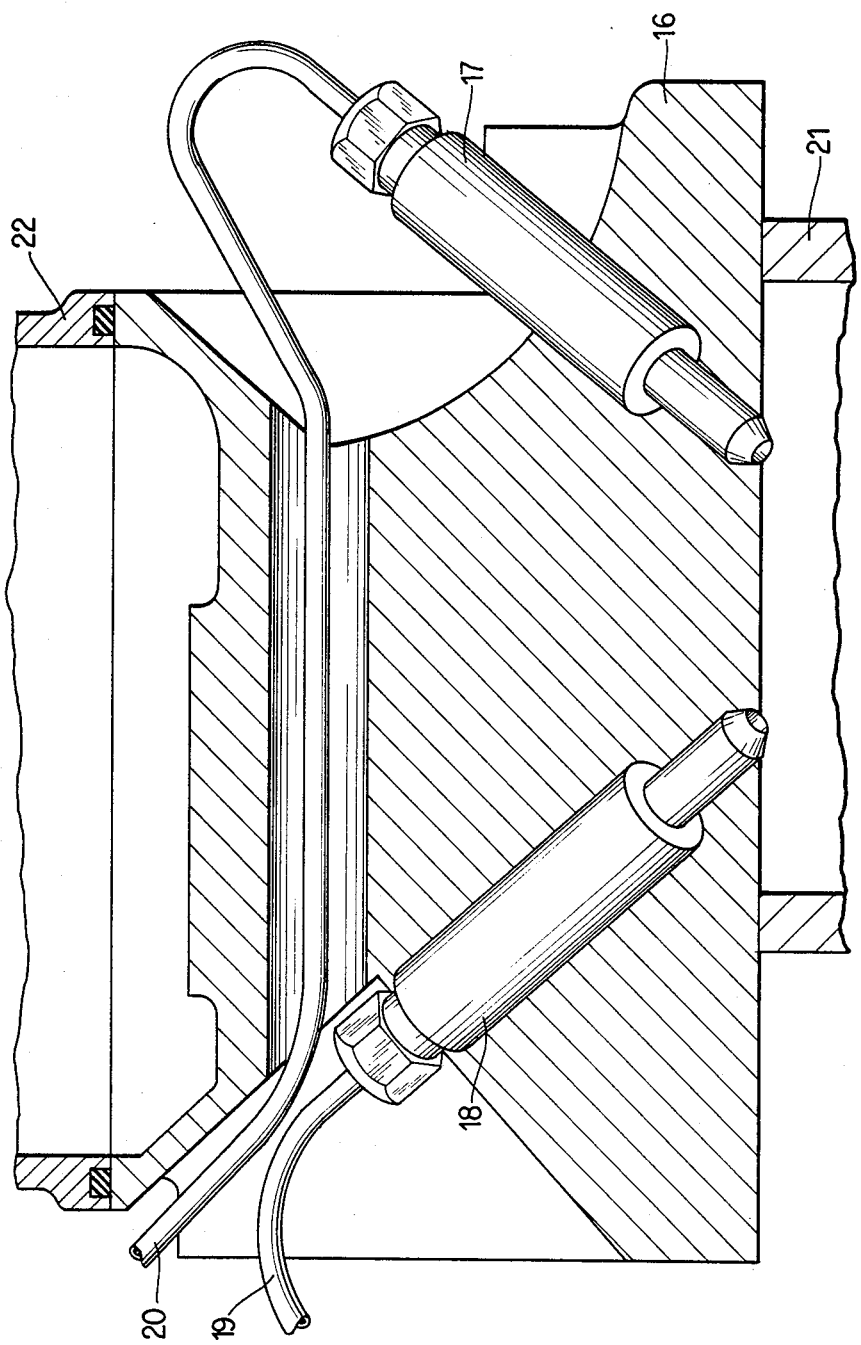
FIG. 5 shows cylinder head for two injection nozzles.

FIG. 5 shows a cylinder head 16 for two injection nozzles 17 and 18. The cylinder head is bounded from below by the cylinder 21 and from above by the cylinder head cover 22. The fuel line 19 leads directly to the nozzle while the fuel line 20 for the second nozzle extends through a bore in the cylinder head.

We claim:

1. A method of operating a combustion engine, particularly a direct-injection diesel engine, having a combustion chamber, comprising the steps of admitting air into said chamber; admitting fuel into said chamber, mixing said fuel with at least part of said air to form a combustible mixture; compressing said air in said chamber; combusting said mixture to generate power, the pressure in said chamber increasing during the combusting step; rotating a crankshaft with the power generated during the combusting step; and maintaining the pressure increase per degree of crankshaft rotation during the combusting step at least approximately equal to the maximum pressure increase during the compressing step.

2. The method of claim 1, wherein the air admitting step comprises imparting a circulatory motion to said air so that said air forms a vortex in said chamber, said vortex having a central portion and a peripheral portion surrounding said central portion, and the mixing step including mixing said fuel with the air in said central portion to form an at least approximately stoichiometric combustible mixture.

3. The method of claim 2, wherein the fuel admitting step comprises admitting at least two streams of fuel into said chamber.

4. The method of claim 1, said chamber being bounded by a peripheral wall, and said fuel being in a non-gaseous state upon admission into said chamber; and further comprising the steps of converting said fuel to a gaseous state, and maintaining said fuel out of contact with said peripheral wall until the converting step is substantially complete.

5. The method of claim 4, wherein said fuel is of vegetable origin.

6. The method of claim 4, wherein the step of maintaining said fuel out of contact with said peripheral wall comprises maintaining said fuel in suspension.

7. The method of claim 1, wherein said fuel is in a non-gaseous state upon admission into said chamber; and further comprising the step of converting said fuel to a gaseous state before the temperature in said chamber reaches a value at which combustion of said fuel generates carbonaceous particles.

8. The method of claim 7, wherein said fuel is of vegetable origin.

9. The method of claim 1, wherein the fuel admitting step comprises admitting at least two streams of fuel into said chamber through respective apertures; and further comprising the step of regulating the cross-sectional area of at least one of said apertures.

10. The method of claim 1, wherein the fuel admitting step comprises admitting at least two streams of fuel into said chamber through respective apertures, the admitting step for one of said streams being initiated prior to the admitting step for the other of said streams.

11. The method of claim 10, wherein the step of maintaining the pressure increase comprises regulating the cross-sectional area of at least one of said apertures.

12. The method of claim 10, wherein the fuel admitting step comprises conveying said fuel from a fuel source to said apertures along respective paths, one of said paths being longer than the other of said paths.

13. The method of claim 12, wherein said engine includes a cylinder head which bounds said chamber and the fuel admitting step comprises conveying fuel to at least one of said apertures via said cylinder head.

14. The method of claim 13, wherein said apertures are disposed at substantially diametrically opposite sides of said chamber and the fuel admitting step comprises conveying fuel to said one aperture by passing such fuel across said chamber through said cylinder head.

15. The method of claim 1, wherein the air admitting step comprises imparting a circulatory motion to said air so that said air forms a vortex in said chamber, said vortex having a central portion containing air in an amount at least approximating that required to form a stoichiometric combustible mixture with said fuel, and said vortex further having a peripheral portion which surrounds said central portion and contains excess air; and further comprising the step of establishing a temperature differential between said central portion and said peripheral portion, the establishing step including cooling at least part of said air.

16. The method of claim 1, further comprising the steps of lubricating said engine with a lubricant; and cooling said engine by circulating a cooling fluid therethrough, said cooling fluid being constituted substantially exclusively by said lubricant.

* * * * *